(12) United States Patent
Caceres et al.

(10) Patent No.: US 11,245,684 B2
(45) Date of Patent: Feb. 8, 2022

(54) USER ENROLLMENT AND AUTHENTICATION ACROSS PROVIDERS HAVING TRUSTED AUTHENTICATION AND IDENTITY MANAGEMENT SERVICES

(71) Applicant: Verizon Patent and Licensing Inc., Arlington, VA (US)

(72) Inventors: Manuel Enrique Caceres, Basking Ridge, NJ (US); Jyotsna Kachroo, Millburn, NJ (US); Dayong He, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 352 days.

(21) Appl. No.: 16/273,502

(22) Filed: Feb. 12, 2019

(65) Prior Publication Data
US 2020/0259815 A1   Aug. 13, 2020

(51) Int. Cl.
*H04L 29/06* (2006.01)

(52) U.S. Cl.
CPC ...... *H04L 63/0815* (2013.01); *H04L 63/0414* (2013.01); *H04L 63/0823* (2013.01); *H04L 63/0884* (2013.01)

(58) Field of Classification Search
CPC ............ H04L 63/0414; H04L 63/0815; H04L 63/0823; H04L 63/0884; H04L 63/102; H04L 9/321; H04L 9/3247; G06F 21/33; G06F 21/41; G06F 21/45
See application file for complete search history.

(56) References Cited

U.S. PATENT DOCUMENTS

| 2004/0158746 | A1* | 8/2004 | Hu | G06F 21/41 |
| | | | | 726/8 |
| 2012/0072714 | A1* | 3/2012 | Grandcolas | H04L 9/3226 |
| | | | | 713/155 |
| 2019/0097996 | A1* | 3/2019 | Gong | H04L 9/32 |

\* cited by examiner

*Primary Examiner* — Olugbenga O Idowu (57) ABSTRACT

A provider receives a message from a user device requesting that the provider share user credentials associated with a user of the user device with a second provider when the user is attempting to enroll with or access goods or services associated with the second provider via an application on the user device. The message requests that the provider send the user credentials to the user device. The provider determines whether the user has been authenticated by the provider and whether a trust relationship exists between the provider and the second provider. The provider sends the user credentials to the user device when the user has been authenticated by the provider and when the trust relationship exists between the provider and the second provider. The user device forwards the user credentials to the second provider and the second provider authenticates the user based on the user credentials.

20 Claims, 10 Drawing Sheets

USER ENROLLMENT AND AUTHENTICATION ACROSS PROVIDERS HAVING TRUSTED AUTHENTICATION AND IDENTITY MANAGEMENT SERVICES

BACKGROUND

Many organizations require identity management in order to properly provide services to users. Each organization may have its own authentication/identity management service. In such cases, each time a user accesses a new organization, the user is required to enroll with the organization and the organization authenticates the user based on the information submitted by the user. However, it is time consuming to enroll with a new organization every time a user accesses a new service. In addition, it is burdensome for a user to remember different passwords and other login information for each organization every time the user accesses a service.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Currently, if a user wishes to enroll to initially access goods or services associated with more than one provider, the user is required to be authenticated through an enrollment process with each provider separately. The initial enrollment process may require the user to provide personal information and register a user name and a password in order to build a user identity to be used for authenticating the user in the future when the user accesses goods or services associated with the provider. In some instances, after the initial enrollment, the user may be required to be authenticated each time the user accesses each provider by entering the user name and password or by providing other information.

Implementations described herein relate to methods, devices, and systems for allowing a user of a first provider to enroll with a trusted second provider using the credentials used to authenticate the user with the first provider. The second provider may become a trusted provider after a trust relationship is established between the first provider and the second provider. For example, a trust relationship may be established between the first provider and the second provider through a key exchange. As another example, the trust relationship may be established between the first provider and the second provider via a third party. When the trust relationship has been established, the first provider may share the credentials with the trusted second provider. In one implementation, the first provider may share the credentials with the trusted second provider via a user device associated with the user. In this way, a user may be able to access goods and services associated with the second provider without enrolling with the second provider when the trust relationship has been established between the first and second providers. The second provider may use the trust relationship with the first provider in lieu of an enrollment process in order to enroll a user. A user may be able to access many different providers that have a trust relationship with the first provider by performing enrollment steps with only the first provider.

Implementations described herein further relate to methods, devices, and systems for allowing a user to authenticate with a first provider when the first provider's authentication service is disrupted. A user may be authenticated with a second provider when the first provider and the second provider have established a trust relationship. In this way, the user may still access services associated with the first provider without being authenticated by the first provider.

Figure 1:
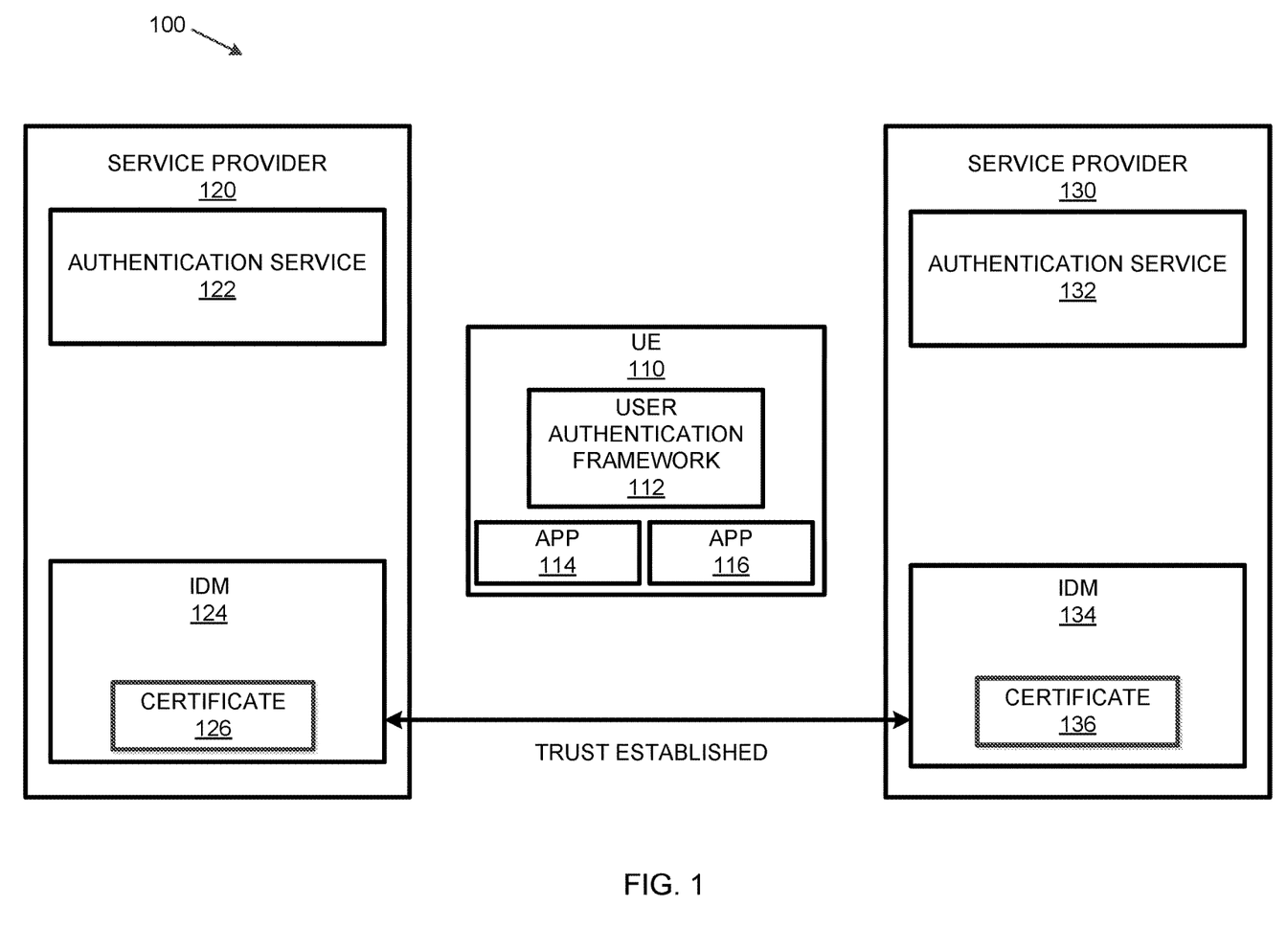
FIG. 1 is a diagram illustrating an exemplary environment in which systems and/or methods, described herein, may be implemented.

FIG. 1 is a diagram illustrating an exemplary environment 100 in which systems and/or methods, described herein, may be implemented. As shown in FIG. 1, environment 100 may include a user equipment (UE) 110, a first provider 120, and a second provider 130. UE 110 may include a user authentication framework 112, a first application ("app") 114, and a second app 116. First provider 120 may include a first authentication service 122 and a first identity management service ("IDM service" or "IDM") 124, which stores certificate 126. Second provider 130 may include a second authentication service 132 and a second IDM 134, which stores certificate 136.

UE 110 may include any device capable of communicating via a network. For example, UE 110 may correspond to a mobile communication device (e.g., a mobile phone, a smart phone, a personal digital assistant (PDA), or a wireline telephone), a computer device (e.g., a laptop computer, a tablet computer, or a personal computer, a notebook, a netbook, a wearable computer (e.g., a wrist watch, eye glasses, etc.)), a gaming device, a music playing device, a home appliance device, a home monitoring device, a set top box, a computation device onboard a machine (a smart car, drone, robot, etc.), a computation terminal (e.g., a kiosk, an ATM, etc.), or another type of communication or computation device.

User authentication framework 112 may facilitate authentication, authorization, and user management of a user associated with UE 110 when enrolling with and/or accessing services associated with provider 120 and provider 130, such as video services, telephone services, music or gaming services, Internet access related services, etc. User authentication framework 112 may ensure that app 114 and app 116 are aware that the user is authenticating to multiple providers. User authentication framework 112 may facilitate authentication of the user with a particular provider based on which application the user launches on UE 110.

App 114 may be associated with provider 120 and app 116 may be associated with provider 130. For example, a user of UE 110 may select app 114 to access services associated with provider 120. In one implementation, provider 120 may provide services associated with telecommunications. In this implementation, a user may open app 114 to access an account associated with provider 120, to change a service plan associated with provider 120, or to perform other functions associated with provider 120. In one implementation, provider 130 may provide services associated with online shopping. In this implementation, a user may access app 116 in order to make online purchases, download online books, or perform other functions associated with provider 130.

Providers 120 and 130 may include network devices that provide backend services to a user of UE 110. Providers 120 and 130 may include service providers and may provide services such as telecommunications services, Internet services, content retrieval services, data streaming services, online shopping services, social network services, or any other type of service. Providers 120 and 130 may include a local area network (LAN), an intranet, a private wide area network (WAN), etc. Providers 120 and 130 may be protected/separated from each other and from other networks by a firewall. Providers 120 and 130 may additionally include the devices to host the services that they provide to users.

Authentication services 122 and 132 may include devices that provide an authentication service. Authentication services 122 and 132 may facilitate authentication of a user of UE 110 attempting to enroll with or access provider 120 or 130 via app 114 or app 116. For example, authentication services 122 and 132 may receive user authentication information from user authentication framework 112 and may use the user authentication information to authenticate the user of UE 110. In one implementation, authentication services 122 and 132 may authenticate the user using an authentication algorithm such as public key encryption in which a user may be authenticated using a public/private key pair. In another implementation, authentication services 122 and 132 may authenticate the user using a different authentication algorithm, such as voice recognition or behavioral recognition. Authentication services 122 and 132 may issue keys subsequent to successful verification of a user attempting to enroll with provider 120 or provider 130. For example, the key may be a public key, a private key, or both according to a public key infrastructure (PKI), and may be used for encryption/decryption of data, authentication, etc. Authentication services 122 and 132 may additionally include server backend components to host the authentication service and related applications.

IDM 124 and 134 may include devices that authenticate the identity of users and store information and actions that users are authorized to access and/or perform. IDM 124 and 134 may include server backend components that issue certificates 126 and 136 upon successful verification of users. IDM 124 and 134 may further store user profiles that include user credentials and other information identifying users, how the users are authenticated, and how the users are identified. A mutual trust relationship may be established between IDM 124 and IDM 134. For example, IDM 134 may trust or accept certificate 126 issued by provider 120 to allow a user to access services associated with provider 130 based on a trust established between IDM 124 and IDM 134. Likewise, IDM 124 may trust or accept certificate 136 issued by provider 130 to allow a user to access services associated with provider 120.

The trust relationship between IDM 124 and IDM 134 may be established in a number of ways. In one implementation, a key exchange or ceremony may be performed between administrators associated with provider 120 and provider 130. In this implementation, the system administrators may meet in a secure location and exchange keys. This implementation may provide the most secure method of achieving the trust relationship because the parties involved physically authenticate one another. In another scenario, a key exchange/ceremony may be performed over existing secure networks. In this scenario, provider 120 and provider 130 may each include a server for communicating with one another. Communications between the two servers may be encrypted and information may be securely exchanged between the two servers via applications or web-based services for performing the key exchange/ceremony. Trust may be established between provider 120 and provider 130 based on the information exchanged between the two servers.

As further explained below with respect to FIGS. 5 and 6, based on the trust established between IDM 124 and IDM 134, a user may automatically enroll with provider 130 when a user is enrolled with provider 120. Because provider 130 trusts the verification and authentication process performed by provider 120, a user may enroll with or access services associated with provider 130 using selected credentials used to authenticate the user with provider 120 and without providing any addition information to provider 130. The credentials that are selected and used may depend on the authentication level required by the particular goods or services and/or the value of the goods/services requested by the user and/or provided by provider 120 and/or provider 130. That is, because of the trust relationship that was previously established between provider 120 and provider 130, provider 130 may trust that the user's enrollment with provider 120 is valid for provider 130.

As used herein, the term "user" is intended to be broadly interpreted to include UE 110 and/or a person using UE 110. Also, the terms "user," "owner," "consumer," "subscriber," and/or "customer" are intended to be used interchangeably.

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. Also, in some implementations, one or more of the displayed devices or networks may perform one or more functions described as being performed by another one or more of the other devices or networks. The devices and networks shown in FIG. 1 may interconnect via wired connections, wireless connections, or a combination of wired and wireless connections.

Figure 2:
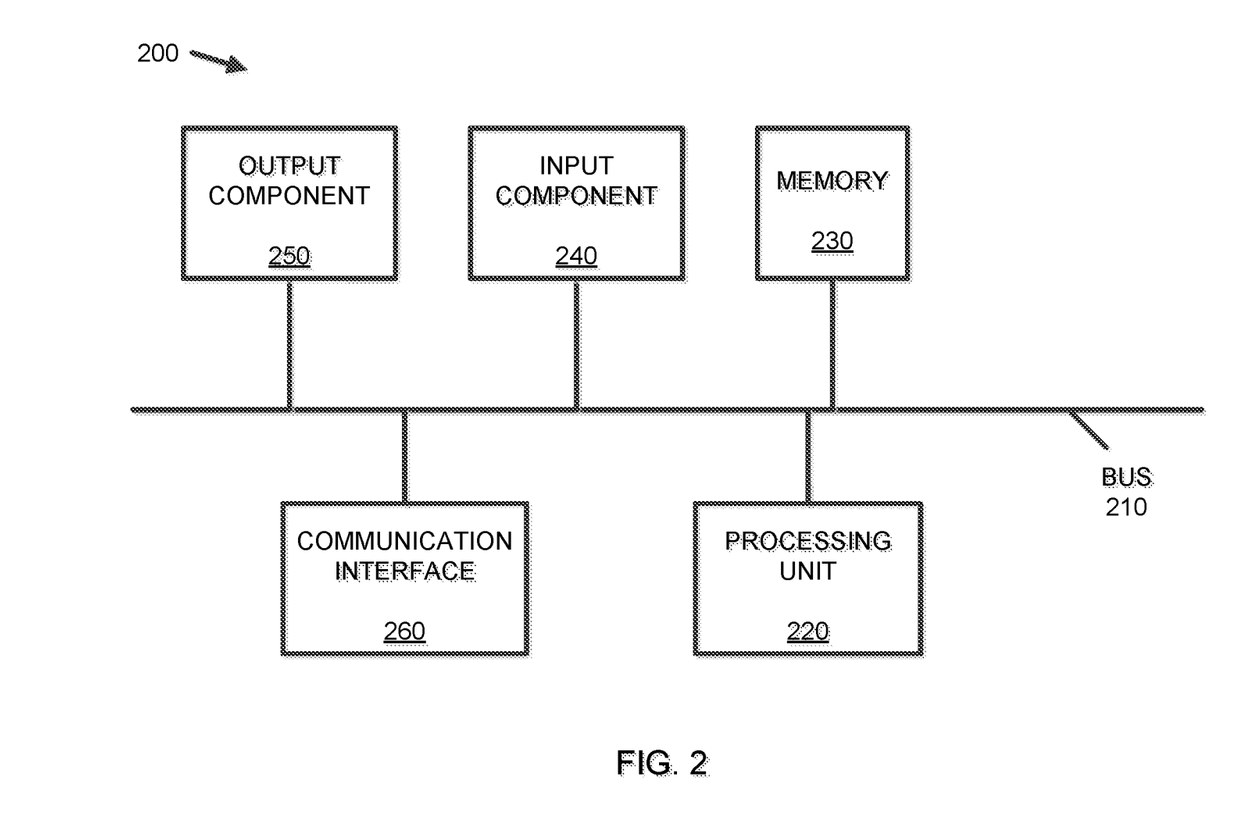
FIG. 2 is a diagram of exemplary components of a device that may be included in the environment shown in FIG. 1.

FIG. 2 is a diagram of example components of a device 200 that may correspond to one of the components of UE 110, provider 120, authentication service 122, IDM 124, provider 130, authentication service 132, or IDM 134. As illustrated, device 200 may include a bus 210, a processing unit 220, a memory 230, an input component 240, an output component 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a button, a switch, a keyboard, a keypad, a mouse, a mircrophone or the like. Output component 250 may include a device that outputs information to the operator, such as a display (e.g., a liquid crystal display), a printer, a speaker, a light emitting diode (LED), etc.

Communication interface 260 may include one or more transceivers that enables device 200 to communicate with other devices and/or systems. For example, communication interface 260 may include one or more radio frequency (RF) receivers, transmitters, and/or transceivers and or more antennas for transmitting and receiving data. Communication interface 260 may also include a modem or Ethernet interface to a LAN or other mechanism for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
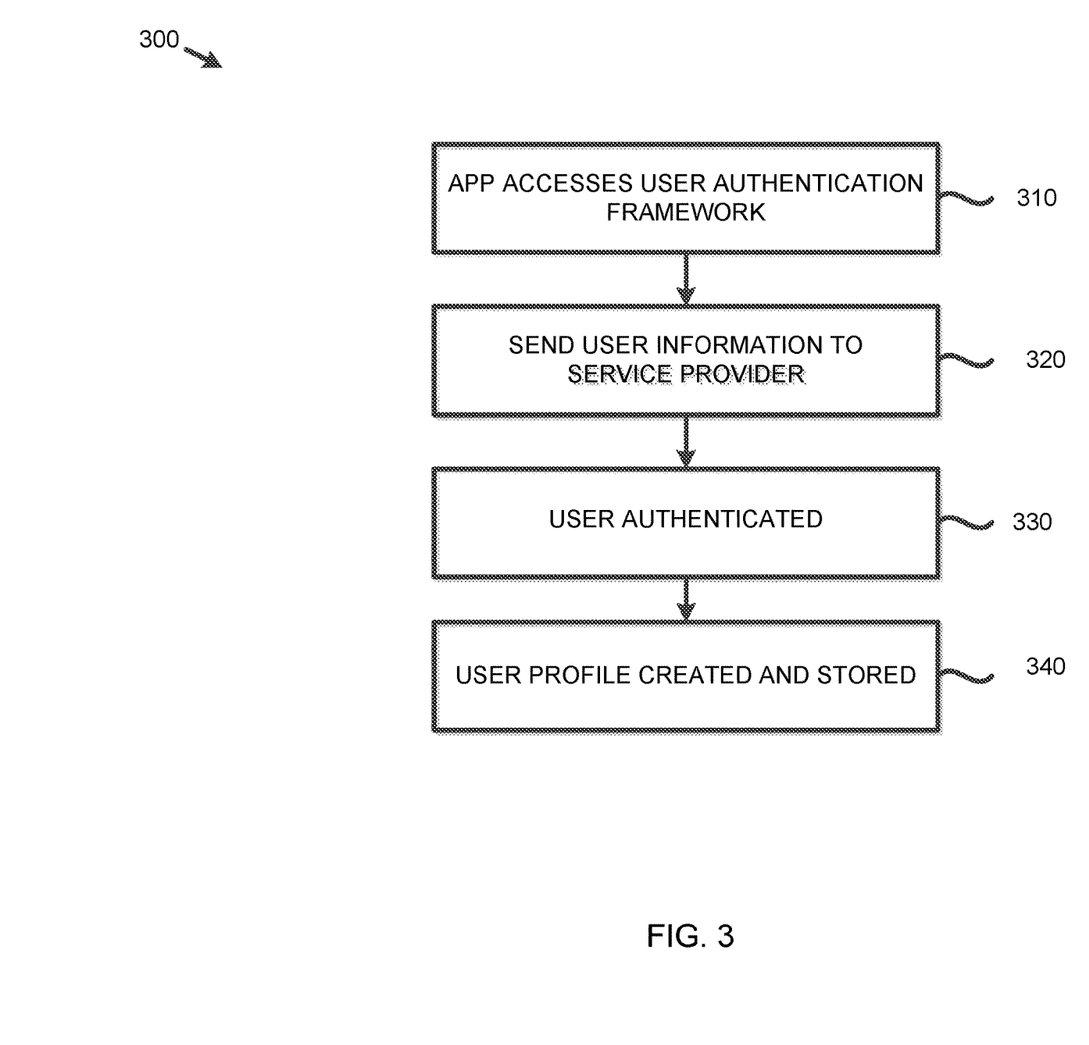
FIG. 3 is a flow chart of an exemplary process in which a user may enroll with a provider.
Figure 4:
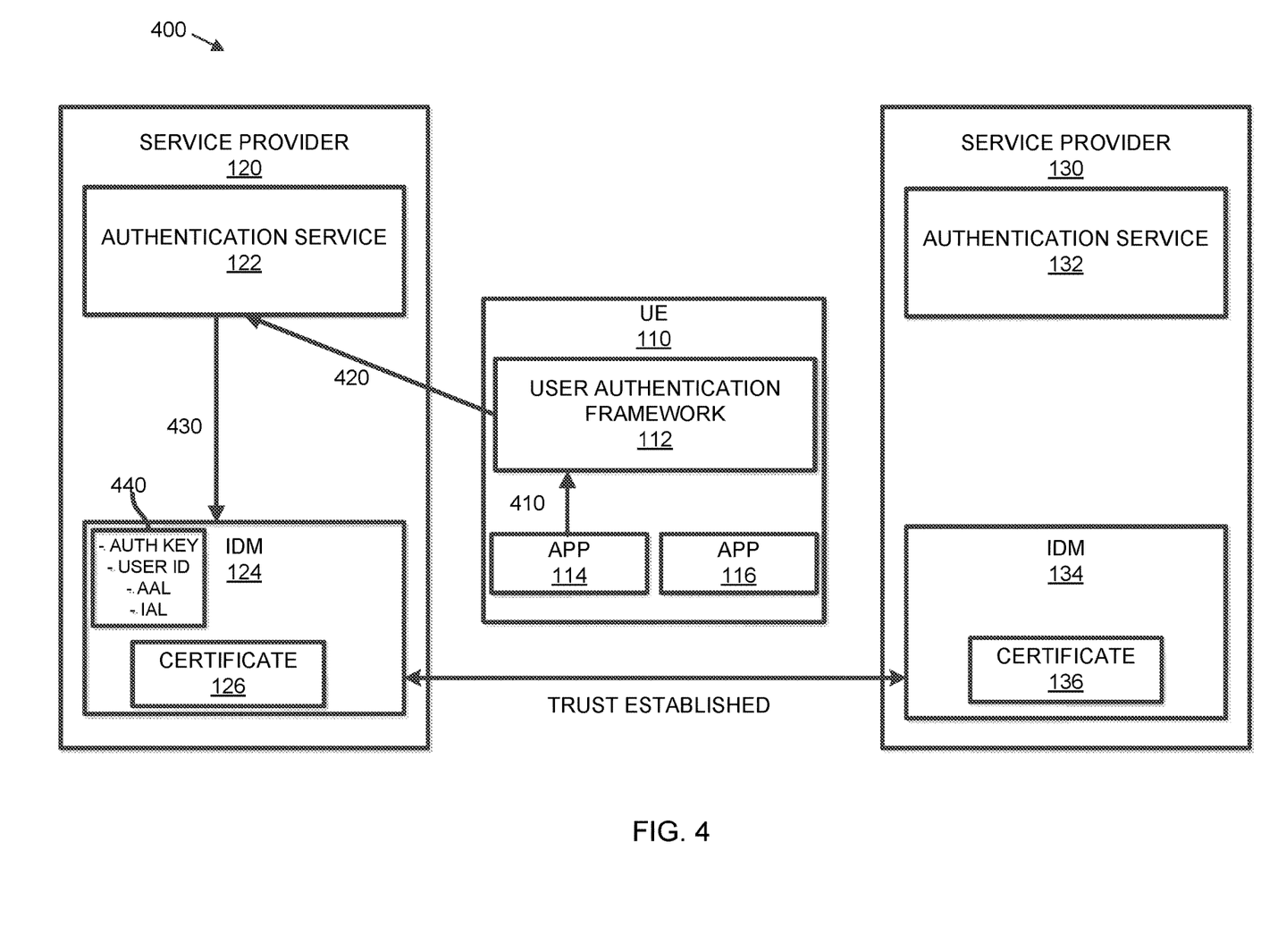
FIG. 4 is a diagram illustrating an exemplary environment in which the user may enroll with a provider.

FIG. 3 is a flow chart of an exemplary process 300 in which a user may enroll with provider 120. FIG. 4 is a diagram illustrating an exemplary environment 400 in which the user may enroll with provider 120.

Process 300 may begin when app 114 accesses user authentication framework 112 in response to a user launching app 114 on UE 110 (block 310). As shown in FIG. 4, app 114 may access user authentication framework 112 on UE 110 (410). For example, the user may launch app 114 to enroll with provider 120 to initially create a user identity in order to access goods or services associated with provider 120. App 114 may access user authentication framework 112 to facilitate the enrollment process.

Process 300 may continue when UE 110 sends user information to provider 120 (block 320). For example, as shown in FIG. 4, user authentication framework 112 may forward user information to authentication service 122 of provider 120 (420). The user information may include information used to verify an identity of the user and/or information used to authenticate the user in the future. For example, the user information may include a user name, a password, a physical security device and/or other identification information associated with the user. In addition, the user information may include biometric data, such as a fingerprint, palm veins, facial characteristics, iris characteristics, voice characteristics, etc. User authentication framework 112 may further send additional information to authentication service 122 to verify that the user is authorized to be in control of UE 110. For example, user authentication framework 112 may forward a device identifier associated with UE 110, such as a Mobile Directory Number (MDN), International Mobile Equipment Identity (IMEI), or another identifier associated with UE 110.

Process 300 may continue when authentication service 122 authenticates the user (block 330). A user profile including user credentials 440 may be stored at IDM 124 (block 340). As shown in FIG. 4, authentication service 122 may authenticate the user and send user information to IDM 124 (430). The user profile including user credentials 440 may then be created and stored at IDM 124. The user profile may include personal information associated with the user. The user profile may further include information that indicates how the user is authenticated and how the user is identified. In one implementation, user credentials 440 may include the user's authentication key, a user identifier associated with the user, an authentication assurance level (AAL) associated with the user, an identity assurance level (IAL) associated with the user, and/or additional information associated with the user. In another implementation, the user's authentication key may be stored at authentication service 122.

Figure 5:
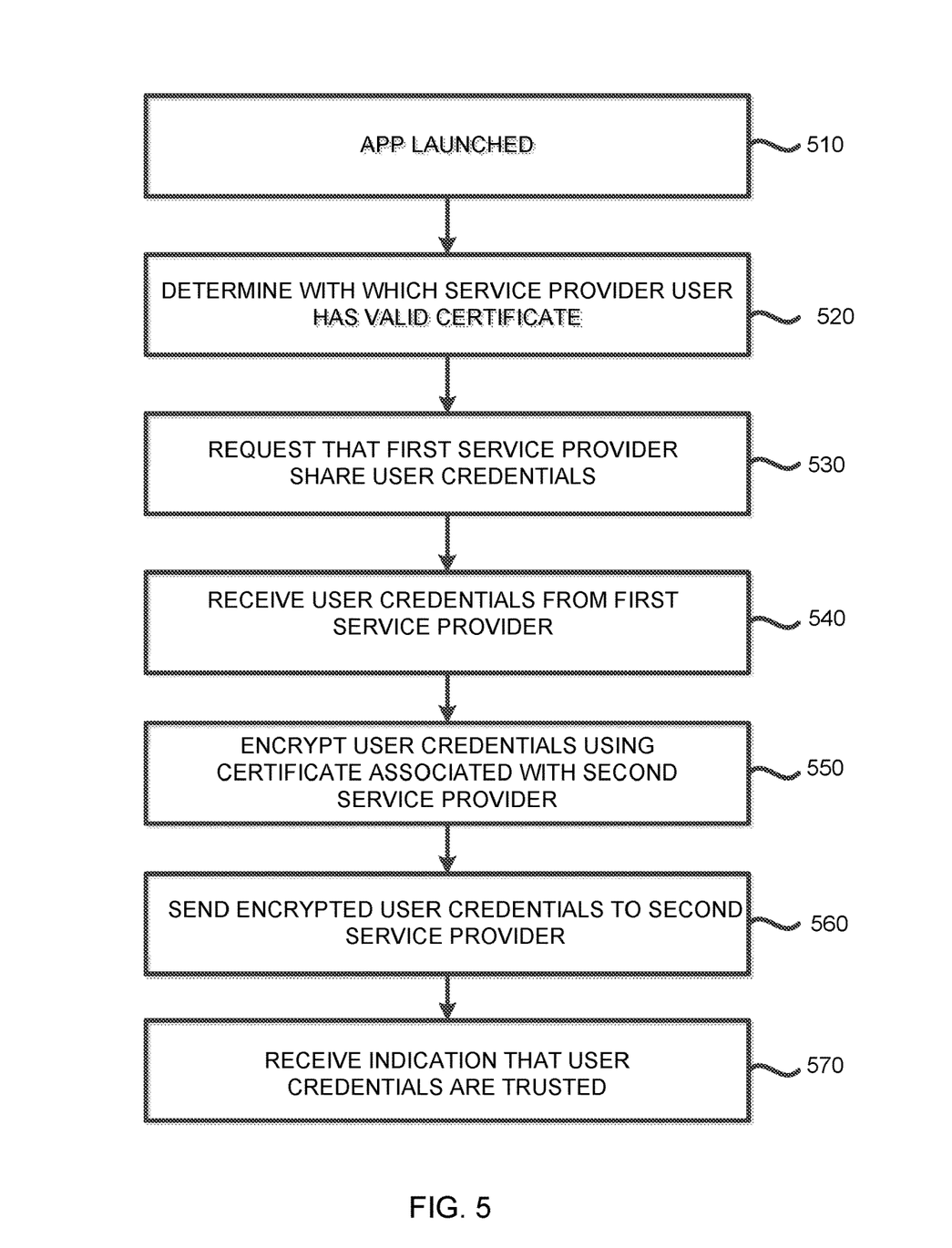
FIG. 5 is a flow chart of an exemplary process in which a user may automatically enroll with a second provider.

FIG. 5 is a flow chart of an exemplary process 500 in which a user may enroll with provider 130 after enrolling with provider 120. FIG. 6 is a diagram illustrating an exemplary environment 600 in which the user may enroll with provider 130 via provider 120. In FIGS. 5 and 6, provider 130 may use the mutual trust established between provider 120 and provider 130 to enroll the user in lieu of an enrollment process.

Process 500 may begin when a user launches app 116 associated with provider 130 (block 510). For example, the user may launch app 116 in order to enroll with provider 130 and access the services provided by provider 130. App 116 may access user authentication framework 112 to determine whether the user has a valid certificate or credentials associated with a provider that is trusted by provider 130 (block 520). As shown in FIG. 6, app 116 may access user authentication framework 112 on UE 110 to determine whether the user has a valid certificate or other credentials with a provider and user authentication framework 112 may determine that the user has a valid certificate with provider 120 (610).

Process 500 may continue with user device 110 requesting that provider 120 share user credentials 440 with provider 130 (block 530). For example, as shown in FIG. 6, user authentication framework 112 may send user information and credentials to authentication service 122 and may request that provider 120 share user credentials 440 with provider 130 (612).

Figure 6:
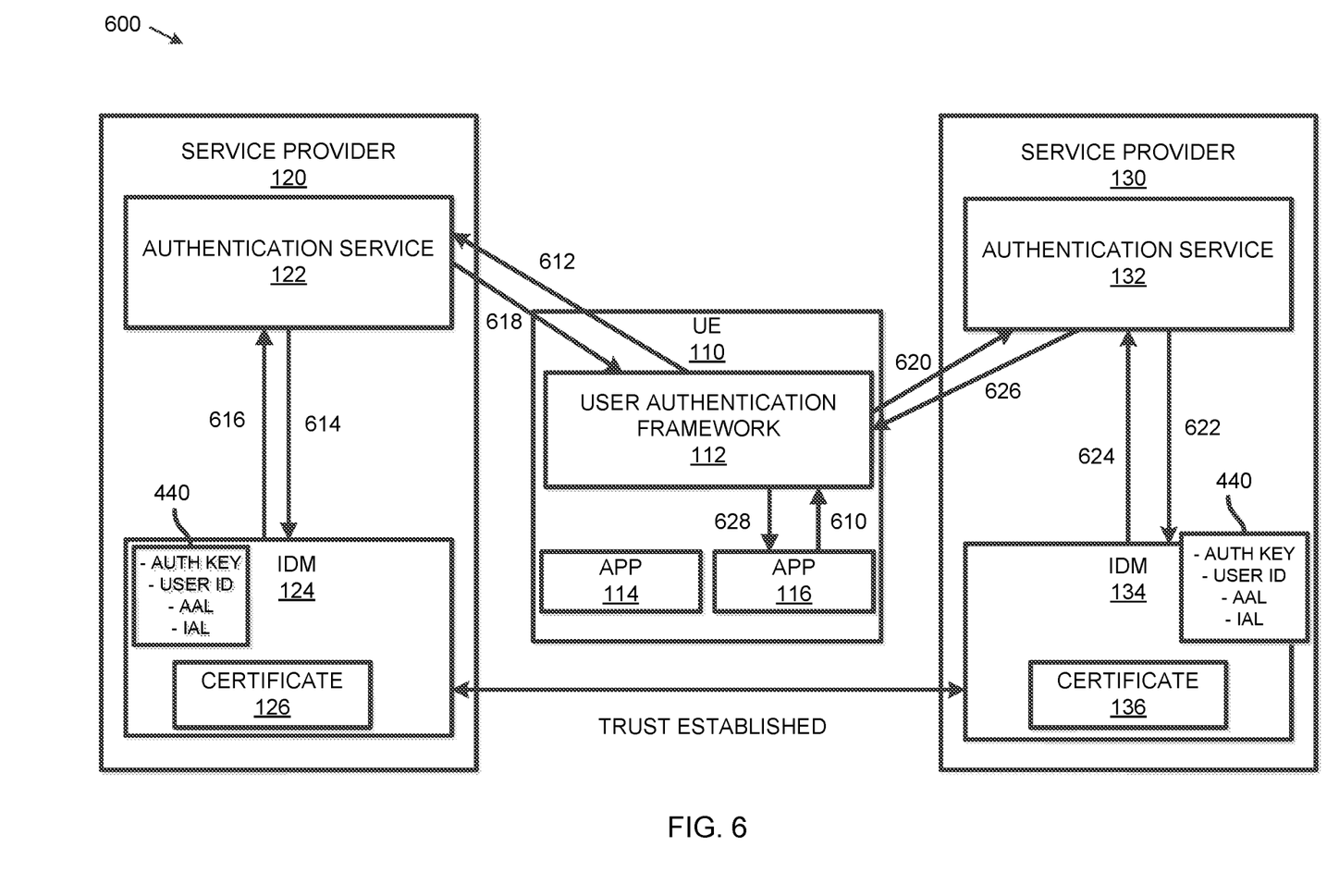
FIG. 6 is a diagram illustrating an exemplary environment in which a user may enroll with a second provider via a first provider.

Continuing with FIG. 6, authentication service 122 may contact IDM 124 to retrieve user credentials 440 using a key associated with the user (614). IDM 124 may determine that provider 130 is a trusted provider and may determine to release user credentials 440 based on the previously established trust relationship. For example, IDM 124 may determine whether a mutual trust has previously been established between provider 120 and provider 130. When a mutual trust has previously been established, IDM 124 may determine to release user credentials 440 and may forward user credentials 440 to authentication service 122 (616).

Process 500 may continue when UE 110 receives user credentials 440 from provider 120 (block 540). As shown in FIG. 6, authentication service 122 may forward user credentials 440 to UE 110 (618). User credentials 440 may include a signature from provider 120 indicating that user credentials 440 are trusted and verified. Authentication service 122 or UE 110 may also encrypt user credentials 440 using certificate 136 associated with provider 130 (block 550) and UE 110 may forward the encrypted user credentials 440 (e.g., an authentication key, user ID, AAL, IAL, etc.) to provider 130 (block 560). In one implementation, a public key associated with certificate 136 may be used to encrypt user credentials 440. In another implementation, user credentials 440 may be signed with a signature associated with certificate 136.

As shown in FIG. 6, user authentication framework 112 may forward encrypted user credentials 440 to provider 130 (620). Since credentials 440 include a signature from provider 120, provider 130 may be assured that user credentials 440 are valid. Additionally, since user credentials 440 are encrypted using certificate 136 associated with provider 130, user credentials 440 may only be decrypted by provider 130. In this way, user credentials 440 may be secure from interception and/or tampering.

Continuing with FIG. 6, authentication service 132 may receive user credentials 440 from UE 110 and may pass user credentials 440 to IDM 134 (622). IDM 134 may receive user credentials 440 and may verify user credentials 440. In one implementation, IDM 134 may receive user credentials 440 and may decrypt user credentials 440 using a private key associated with provider 130 and/or certificate 136. IDM 134 may further read the information contained in user credentials 440 and verify the authenticity of the information by checking the signature from provider 120. When user credentials 440 are verified, IDM 134 may store credentials 440 and send a message to authentication service 132 indicating that user credentials 440 are trusted (624).

Process 500 may continue when UE 110 receives an indication from provider 130 that user credentials 440 are trusted and that the user is enrolled with provider 130 and may login to app 116 and/or access services from provider 130 (block 570). As shown in FIG. 6, authentication service 132 may send a message to user authentication framework 112 indicating that user credentials 440 are trusted (626) and user authentication framework 112 may allow the user to use app 116 to access services provided by provider 130 (628).

The process described above with respect to FIGS. 5 and 6 may allow a user to enroll with provider 130 without directly providing enrollment information, such as user ID, password, etc., to provider 130. Since provider 120 and provider 130 have previously established a trust relationship, provider 130 may use trusted user credentials 440, which had been established when the user enrolled with provider 120, to enroll with provider 130. In this way, the user may enroll with provider 130 quickly and without performing the typical steps required when enrolling with a provider. Instead, the user may open app 116 and provide user verification (for example, a finger print, a facial identification, a username and password, a code, etc.), and the user may automatically be enrolled with provider 130 without the user performing any additional steps.

Figure 7:
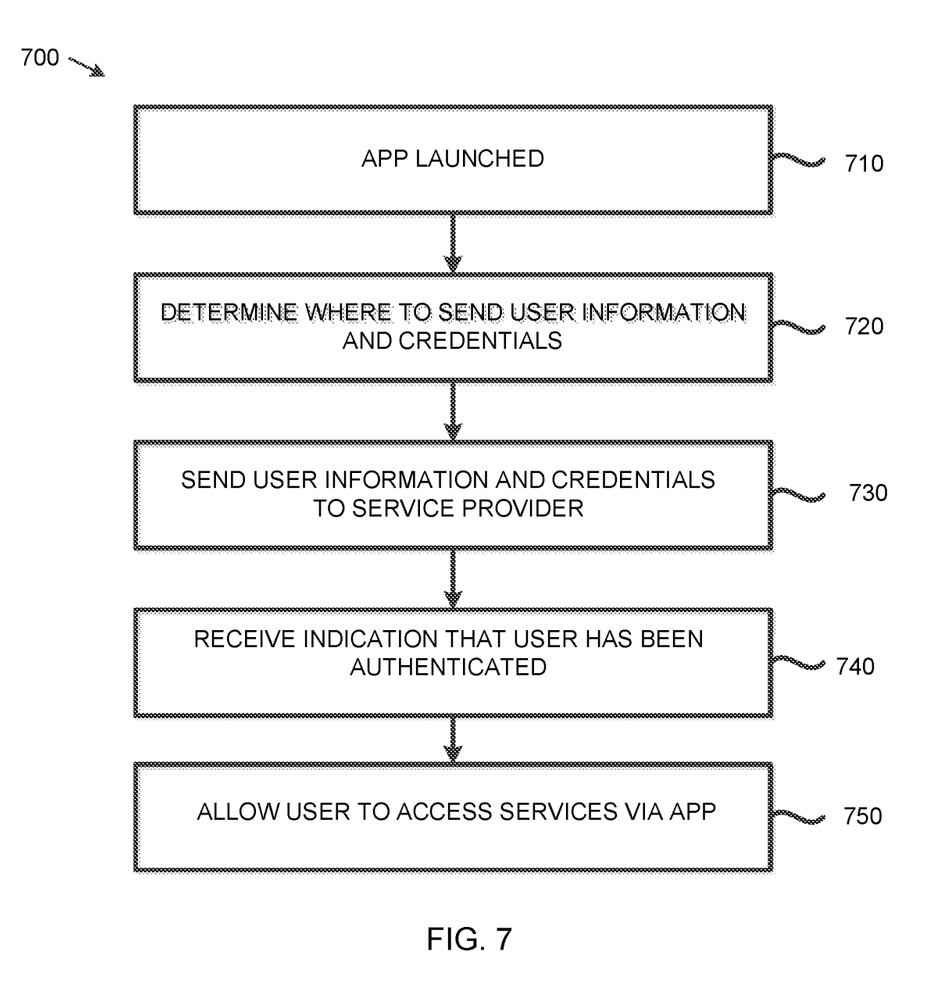
FIG. 7 is a flow chart of an exemplary process in which a user may be authenticated.
Figure 8:
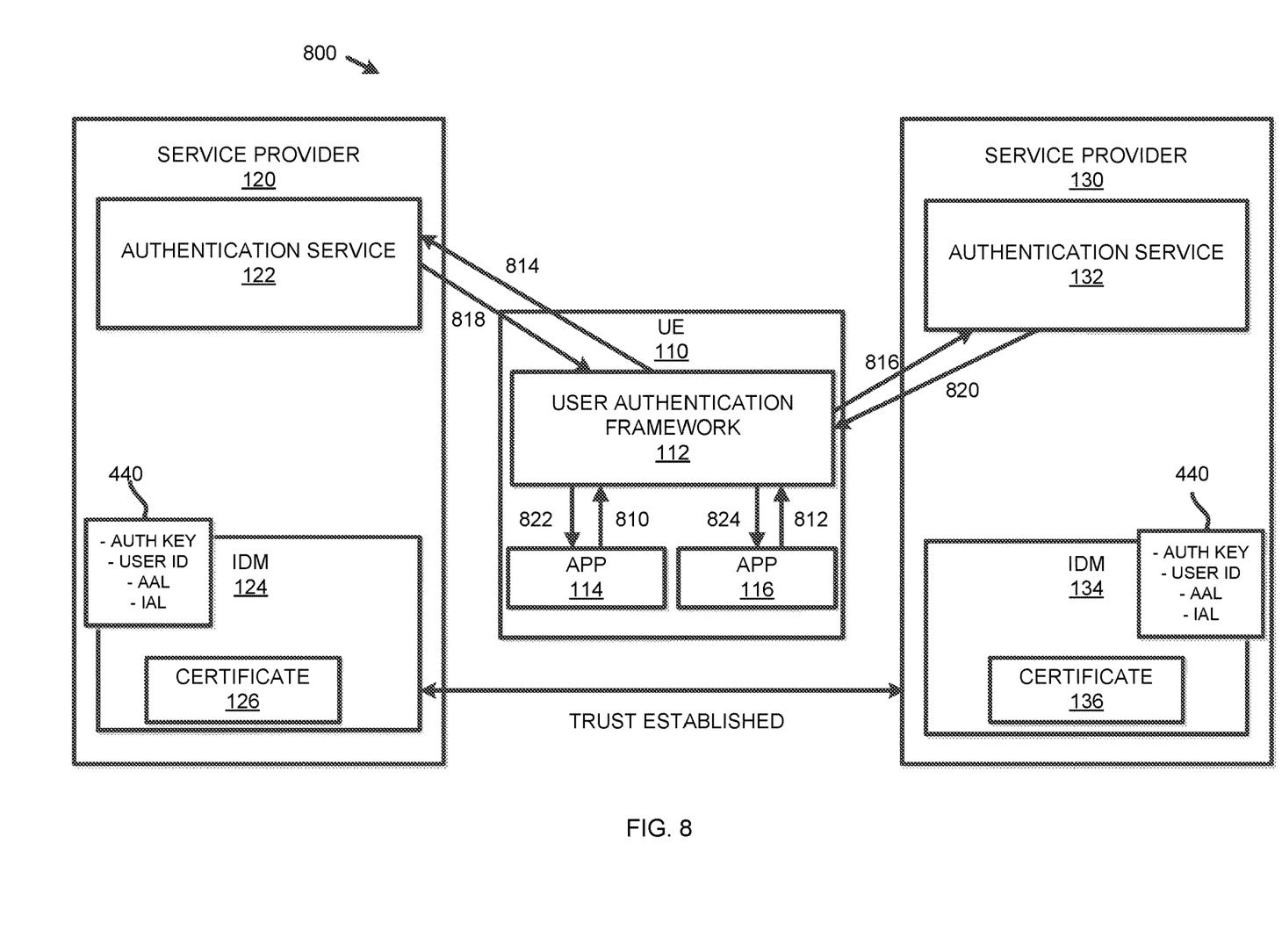
FIG. 8 is a diagram illustrating an exemplary environment in which a user may be authenticated.

FIG. 7 is a flow chart of an exemplary process 700 in which a user may authenticate to provider 120 or provider 130. FIG. 8 is a diagram illustrating an exemplary environment 800 in which the user may be authenticated to provider 120 or provider 130 after enrollment.

Process 700 may begin when a user launches app 114 or app 116 (block 710). Based on whether app 114 or app 116 was launched, user authentication framework 112 may determine whether to send user information and credentials to provider 120 or provider 130 (block 720). For example, if the user launches app 114, user authentication framework 112 may determine that the user is attempting to access services associated with provider 120. Similarly, if the user launches app 116, user authentication framework may determine that the user is attempting to access services associated with provider 130.

As shown in FIG. 8, a user may launch app 114 or app 116 and app 114 or 116 may access user authentication framework 112 (810 or 812). User authentication framework 112 may determine whether app 114 or app 116 was launched and may attempt to authenticate to either provider 120 or provider 130 using the same set of credentials.

Process 700 may continue with user authentication framework 112 sending the user information and credentials to provider 120 or provider 130 (block 730). In one example, if the user launched app 114, user authentication framework 112 may send user information and credentials to provider 120 (814). Similarly, when user authentication framework 112 determines that the user launched app 116, user authentication framework 112 may send the same user information and credentials to provider 130 (816).

Although the user information and credentials were initially used to enroll with provider 120, since provider 130 trusts provider 120 and has verified user credentials 440, as discussed above with respect to FIGS. 5 and 6, provider 130 may authenticate the user using the same user information and credentials that may be used by provider 120 to authenticate the user.

Process 700 may continue with UE 110 receiving an indication that the user has been authenticated (block 740) and may access services associated with provider 120 or provider 130 (block 750). As shown in FIG. 8, in one implementation, user authentication framework 112 may receive an indication from provider 120 that the user is authenticated and may login to app 114 (818). As further shown in FIG. 8, in another implementation, user authentication framework 112 may receive a message from provider 130 that the user is authenticated and may login to app 116 (820). When the user has been authenticated, the user may be able to access the services associated with provider 120 or provider 130 via app 114 or app 116. As shown in FIG. 8, user authentication framework 112 may allow the user to access the services associated with provider 120 or provider 130 via app 114 or app 116 (822 and 824).

Figure 9:
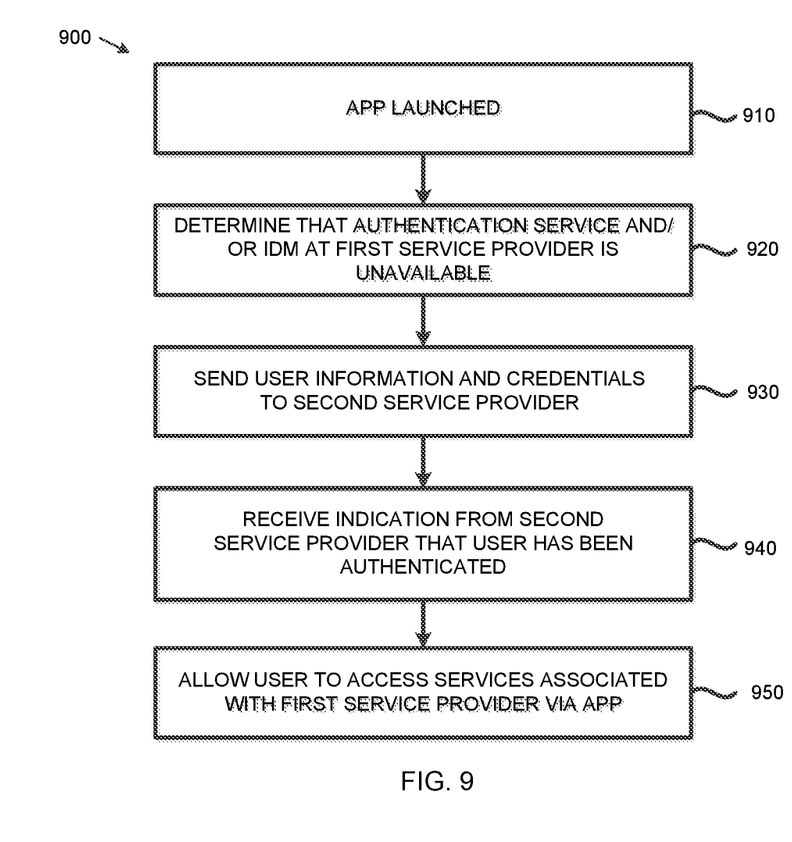
FIG. 9 is a flow chart of an exemplary process in which a user may be authenticated to a first provider.
Figure 10:
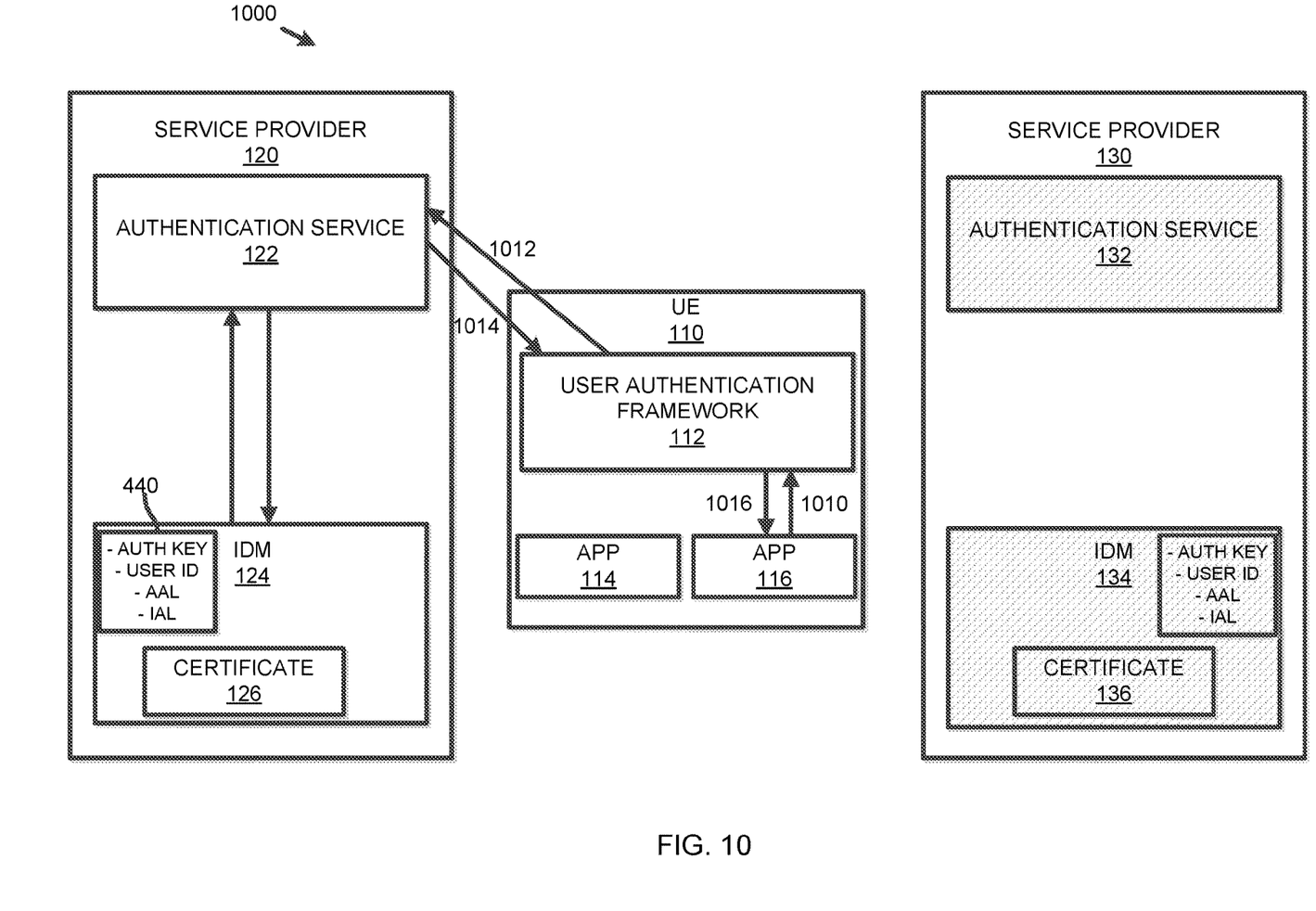
FIG. 10 is a diagram illustrating an exemplary environment in which a user may be authenticated to a second provider.

FIG. 9 is a flow chart of an exemplary process 900 in which a user may be authenticated to provider 130 when authentication service 132 is not available. FIG. 10 is a diagram illustrating an exemplary environment 1000 in which the user may be authenticated by provider 120 when authentication service 132 is not available.

Process 900 may begin when a user launches app 116 (block 910). As shown in FIG. 10, the user may launch app 116 and app 116 may access user authentication framework 112 (1010). Process 900 may continue by user authentication framework 112 determining that authentication service 132 and/or IDM 134 is not available (block 920). For example, an attack may have occurred on authentication service 132 and/or IDM 134, authentication service 132 and/or IDM 134 may be experiencing a disruption, power outage, etc., or authentication service 132 and/or IDM 134 may be unavailable for another reason.

User authentication framework 112 may send user information and credentials to provider 120 (block 930). As shown in FIG. 10, user authentication framework 112 may send user information and credentials to authentication service 122 (1012). Because of the trust relationship established between provider 120 and provider 130, if authentication service 132 associated with provider 130 is not available, provider 120 may provide authentication functions to provider 130.

Continuing with FIG. 9, UE 110 may receive an indication from provider 120 that the user is authenticated at provider 120 (block 940) and access to services provided by provider 130 may be granted (block 950). As shown in FIG. 10, after authenticating the user, authentication service 122 may forward a message to user authentication framework 112 indicating that the user is authenticated (1014). User authentication framework 112 may further allow app 116 to access services associated with provider 130 (1016).

While series of acts have been described with respect to FIGS. 3, 5, 7, and 9, the order of acts may be different in other implementations. Moreover, non-dependent acts may be implemented in parallel.

As described above, providers, such as providers 120 and 130, may establish trust relationships in any number of ways. For example, providers 120 and 130 may be divisions of a same company. Alternatively, providers may establish trust relationships for various users/customers on a more granular level. For example, providers 120 and 130 may exchange information regarding users/customers that meet certain requirements, such as users that have previously paid bills associated with providers 120 and 130 on time. In each case, the trust relationship provides each provider with a level of certainty that a user can be given access to that provider's services. In addition, providers 120 and 130 may establish trust based on establishing a secure connection between providers 120 and 130, adopting a mutually agreed upon security protocol, and having a recognized level of security certification, such as an industry accepted level of security.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   receiving, at a provider and from a user device, a message requesting that the provider share user credentials associated with a user of the user device with a second provider,
   wherein the user is attempting to access first goods or services of multiple goods and services associated with the second provider, via an application on the user device, and
   wherein the message requests that the provider send the user credentials to the user device;
   determining, by the provider, whether the user has been authenticated by the provider;
   determining, by the provider, whether a trust relationship exists between the provider and the second provider; and
   sending, by the provider, the user credentials to the user device when the user has been authenticated by the provider and when the trust relationship exists between the provider and the second provider,
   wherein the user device forwards select ones of the user credentials to the second provider corresponding to a first authentication level associated with the first goods or services, wherein the first authentication level is one of a plurality of authentication levels corresponding to the multiple goods and services;
   wherein the second provider authenticates the user based on the select ones of the user credentials, and
   wherein the user device provides access to at least one of the first goods or services associated with the second provider when the user is authenticated by the second provider.

2. The method of claim 1, wherein sending the user credentials to the user device includes sending the user credentials with a signature from the provider, and
   wherein the first authentication level is associated with a value of the first goods or services.

3. The method of claim 1, wherein the user device encrypts the select ones of the user credentials based on a certificate associated with the second provider and forwards the encrypted select ones of the user credentials to the second provider.

4. The method of claim 1, wherein receiving the message requesting that the provider share user credentials associated with the user of the user device with the second provider includes receiving the message and authorization information associated with the user.

5. The method of claim 1, further comprising:
   receiving, at the provider and from the user device, a request to authenticate the user with the second provider when the user is attempting to authenticate with the second provider and authentication services associated with the second provider are unavailable.

6. The method of claim 5, further comprising:
sending, by the provider and to the user device, an indication that the user is authenticated with the second provider, wherein the user is provided access to the at least one of the first goods or services provided by the second provider via the application when the user is authenticated.

7. The method of claim 1, further comprising:
establishing the trust relationship between the provider and the second provider prior to receiving the message.

8. A system comprising:
a memory configured to store instructions; and
a processor configured to execute the instructions to:
receive, from a user device, a message requesting that a provider associated with the system share user credentials associated with a user of the user device with a second provider,
wherein the user is attempting to access first goods or services of multiple goods and services associated with the second provider, via an application on the user device, and
wherein the message requests that the system send the user credentials to the user device;
determine whether the user has been authenticated by the provider;
determine whether a trust relationship exists between the provider and the second provider; and
send the user credentials to the user device when the user has been authenticated by the provider and when the trust relationship exists between the provider and the second provider,
wherein the user device forwards select ones of the user credentials to the second provider corresponding to a first authentication level associated with the first goods or services, wherein the first authentication level is one of a plurality of authentication levels corresponding to the multiple goods and services,
wherein the second provider authenticates the user based on the select ones of the user credentials, and
wherein the user device provides access to at least one of the first goods or services associated with the second provider when the user is authenticated by the second provider.

9. The system of claim 8, wherein, when sending the user credentials to the user device, the processor is further configured to execute the instructions to:
send the user credentials with a signature from the provider, and
wherein the first authentication level is associated with a value of the first goods or services.

10. The system of claim 8, wherein the processor is further configured to execute the instructions to encrypt the select ones of the user credentials based on a certificate associated with the second provider and forward the encrypted user credentials to the second provider.

11. The system of claim 8, wherein, when receiving the message requesting that the provider share user credentials associated with the user of the user device with the second provider, the processor is further configured to receive the message and authorization information associated with the user.

12. The system of claim 8, wherein the processor is further configured to execute the instructions to:
receive, from the user device, a request to authenticate the user with the second provider when the user is attempting to authenticate with the second provider and authentication services associated with the second provider are unavailable.

13. The system of claim 12, wherein the processor is further configured to execute the instructions to:
send, to the user device, an indication that the user is authenticated, wherein the user is provided access to the at least one of the first goods or services provided by the second provider via the application when the user is authenticated.

14. The system of claim 8, wherein the processor is further configured to execute the instructions to establish the trust relationship between the provider and the second provider prior to receiving the message.

15. A non-transitory computer-readable medium containing instruction, the instructions comprising:
one or more instructions that, when executed by a processor, cause the processor to:
receive, from a user device, a message requesting that a provider associated with the processor share user credentials associated with a user of the user device with a second provider,
wherein the user is attempting to access first goods or services of multiple goods and services associated with the second provider, via an application on the user device, and
wherein the message requests that the provider send the user credentials to the user device;
determine whether the user has been authenticated by the provider;
determine whether a trust relationship exists between the provider and the second provider; and
send the user credentials to the user device when the user has been authenticated by the provider and when the trust relationship exists between the provider and the second provider,
wherein the user device forwards select ones of the user credentials to the second provider corresponding to a first authentication level associated with the first goods or services, wherein the first authentication level is one of a plurality of authentication levels corresponding to the multiple goods and services,
wherein the second provider authenticates the user based on the select ones of the user credentials, and
wherein the user device provides access to at least one of the first goods or services associated with the second provider when the user is authenticated by the second provider.

16. The non-transitory computer-readable medium of claim 15, wherein the one or more instructions that cause the processor to send the user credentials to the user device further comprise one or more instructions that cause the processor to send the user credentials with a signature from the provider, and
wherein the first authentication level is associated with a value of the first goods or services.

17. The non-transitory computer-readable medium of claim 15, wherein the further comprising one or more instructions that cause the processor to encrypt the select ones of the user credentials based on a certificate associated with the second provider and forwards the encrypted user credentials to the second provider.

18. The non-transitory computer-readable medium of claim 15, wherein the one or more instructions that cause the processor to receive the message requesting that the provider share user credentials associated with the user of the user device with the second provider comprise one or more instructions that cause the processor to receive the message and authorization information associated with the user.

19. The non-transitory computer-readable medium of claim 15, wherein the instructions further comprise one or more instructions that cause the processor to:
   receive, from the user device, a request to authenticate the user with the second provider when the user is attempting to authenticate with the second provider and authentication services associated with the second provider are unavailable; and
   send, to the user device, an indication that the user is authenticated, wherein the user is provided access to the at least one of the first goods or services provided by the second provider via the application when the user is authenticated.

20. The non-transitory computer-readable medium of claim 15, the instructions further comprise one or more instructions to cause the processor to establish the trust relationship between the provider and the second provider prior to receiving the message.

* * * * *